Figure 16:
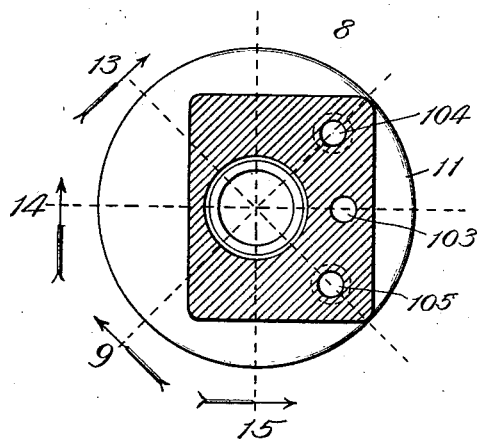

T. O. PERRY.
DEEP WELL PUMP.
APPLICATION FILED APR. 24, 1913.
1,085,756.
Patented Feb. 3, 1914.
10 SHEETS—SHEET 1.
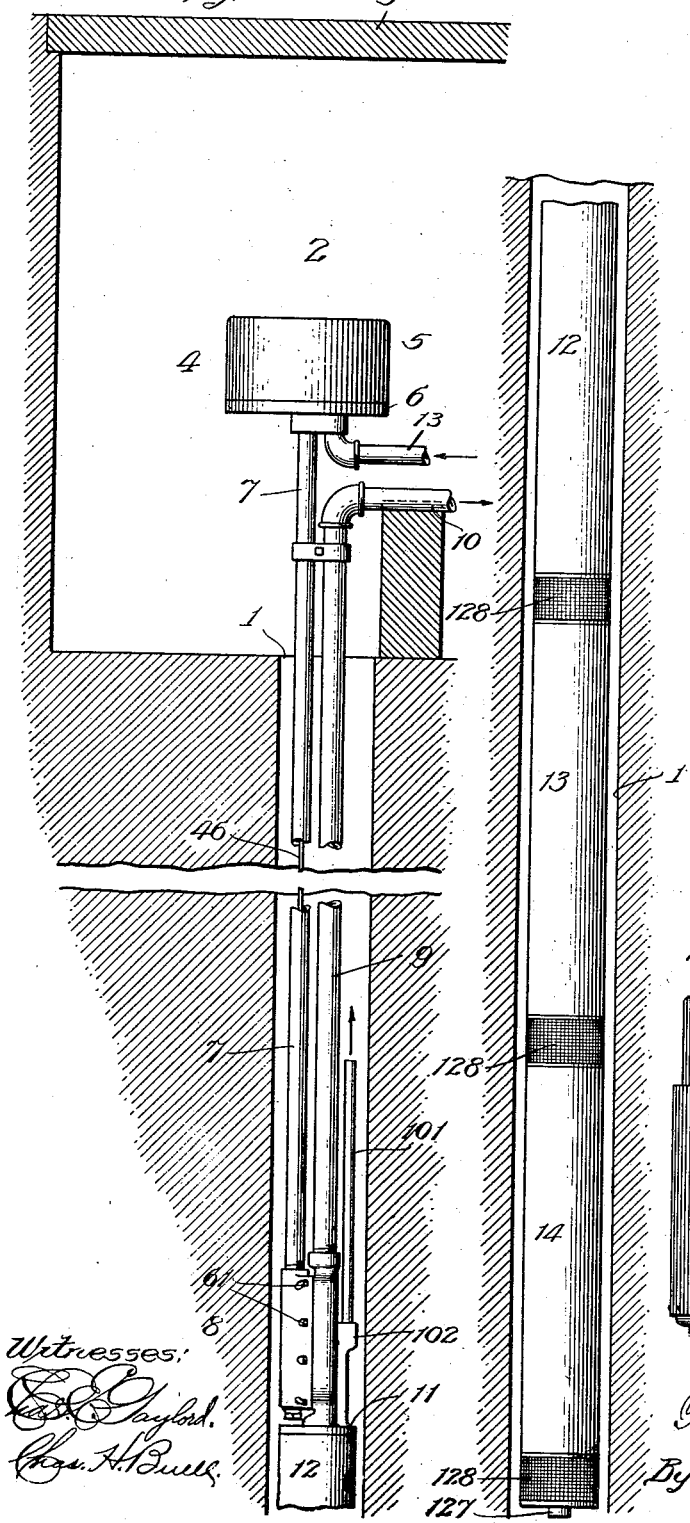
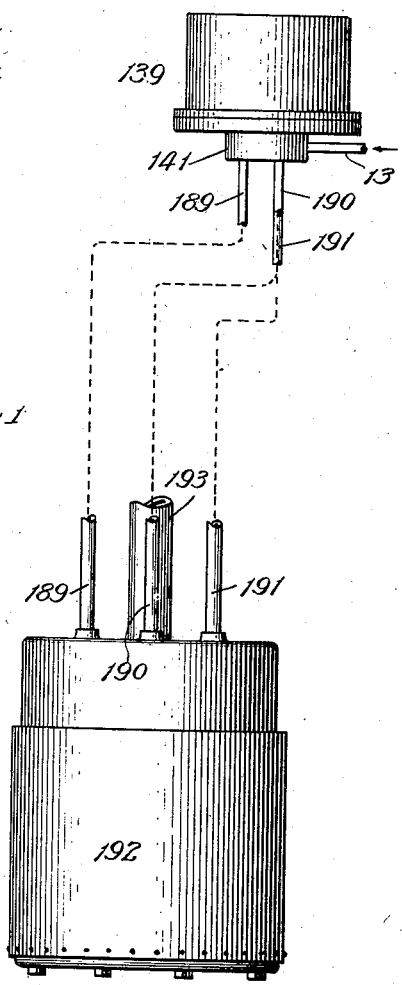

T. O. PERRY.
DEEP WELL PUMP.
APPLICATION FILED APR. 24, 1913.
1,085,756.
Patented Feb. 3, 1914.
10 SHEETS—SHEET 2.
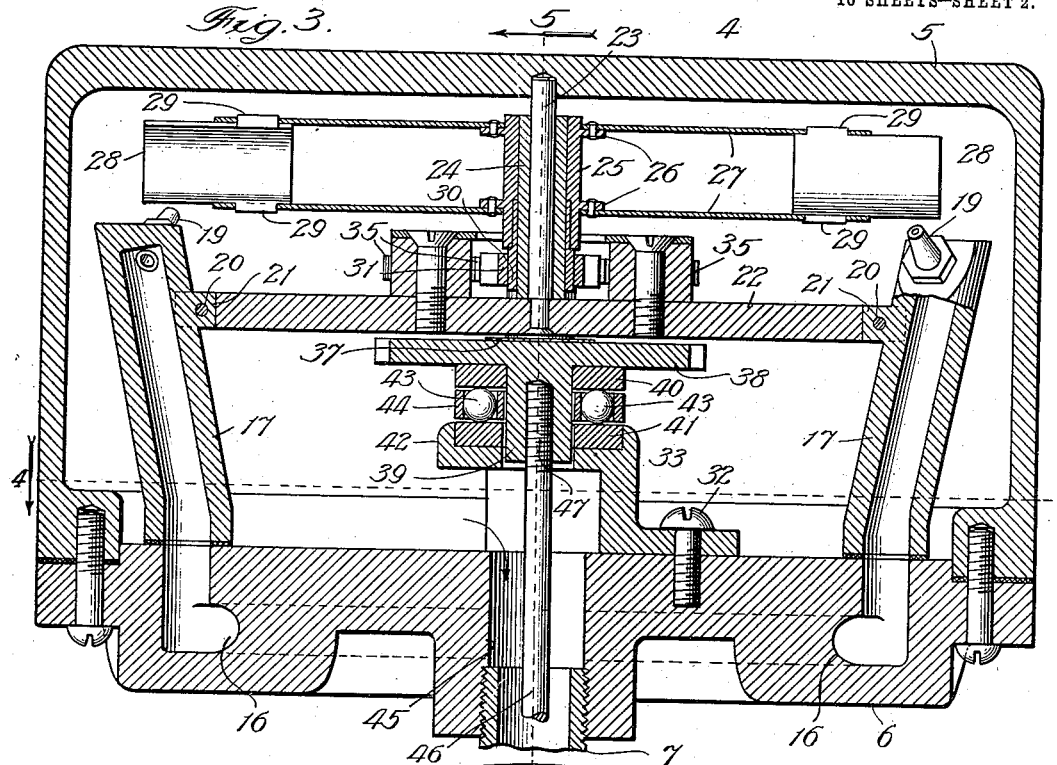
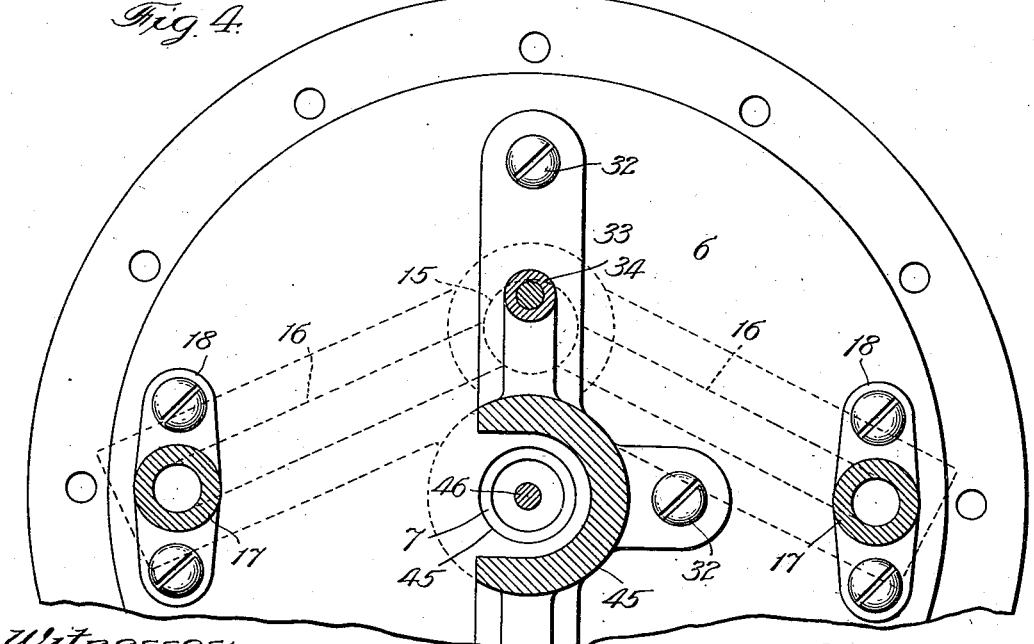

T. O. PERRY.
DEEP WELL PUMP.
APPLICATION FILED APR. 24, 1913.
1,085,756.
Patented Feb. 3, 1914.
10 SHEETS—SHEET 3.
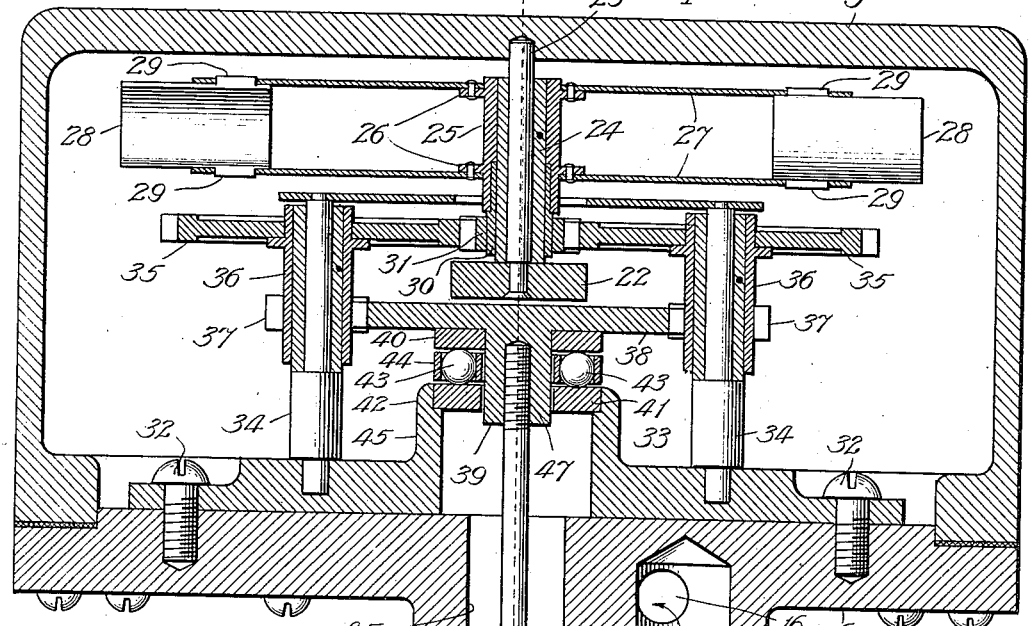
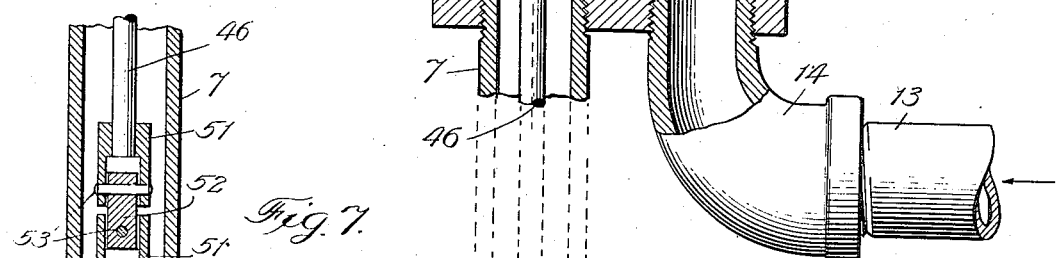
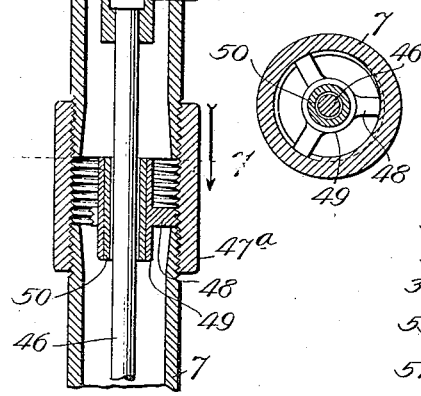
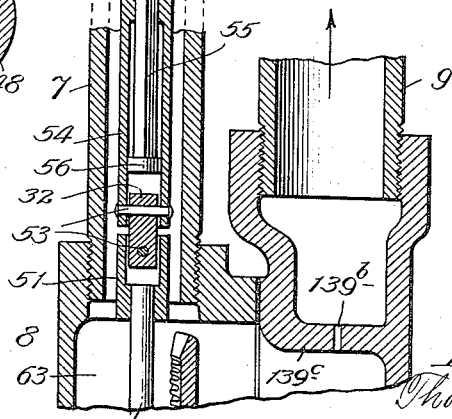

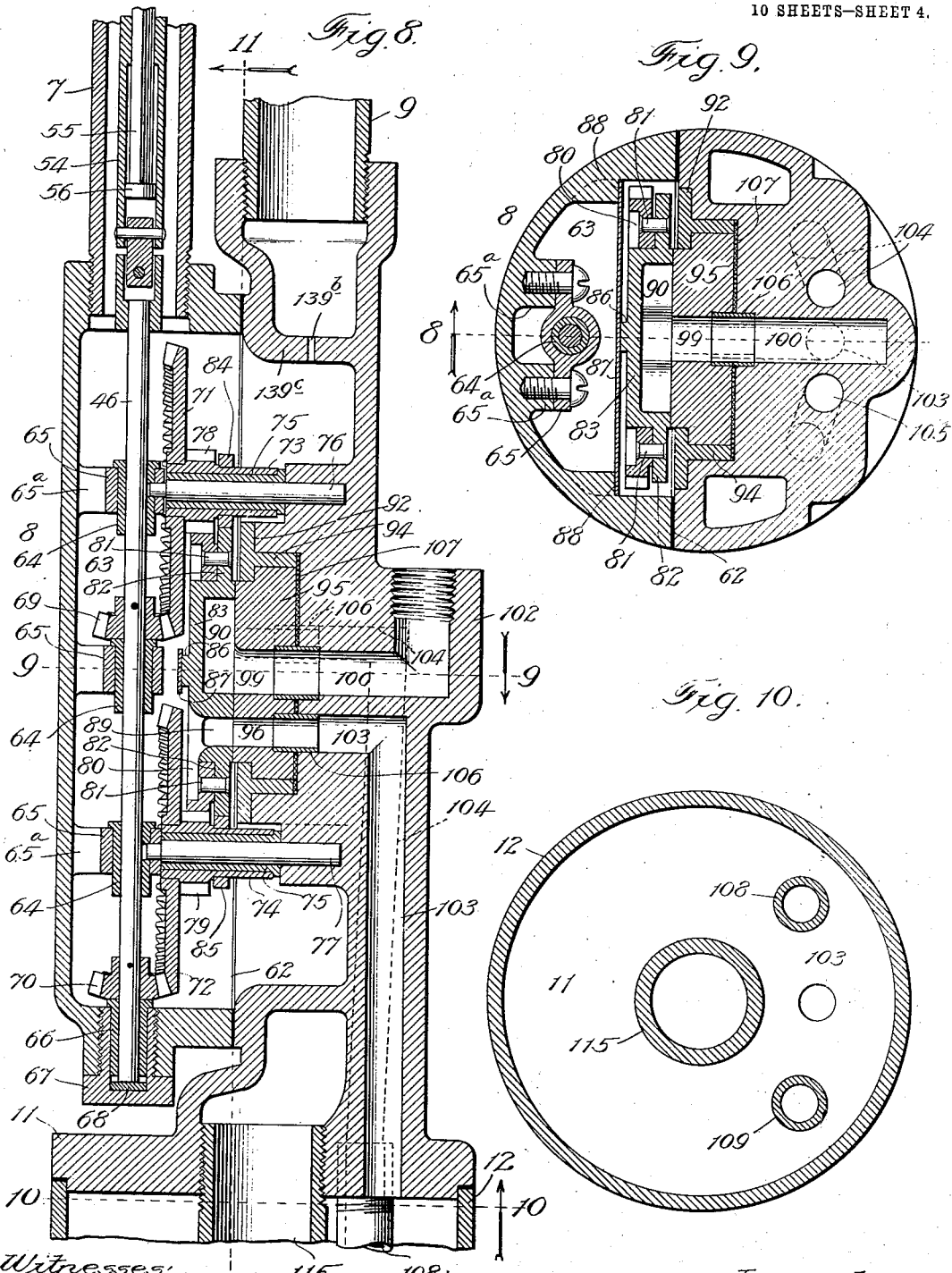

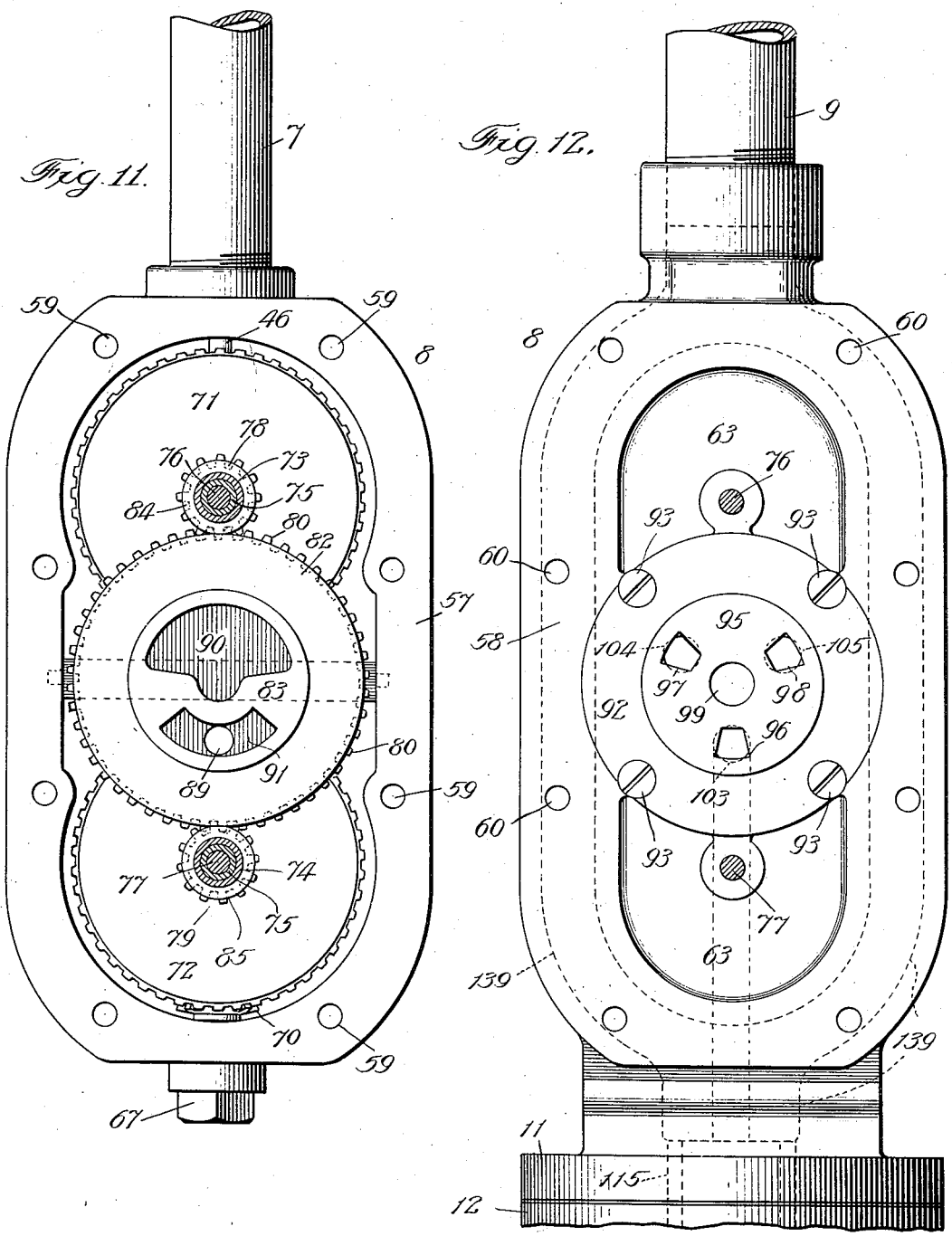

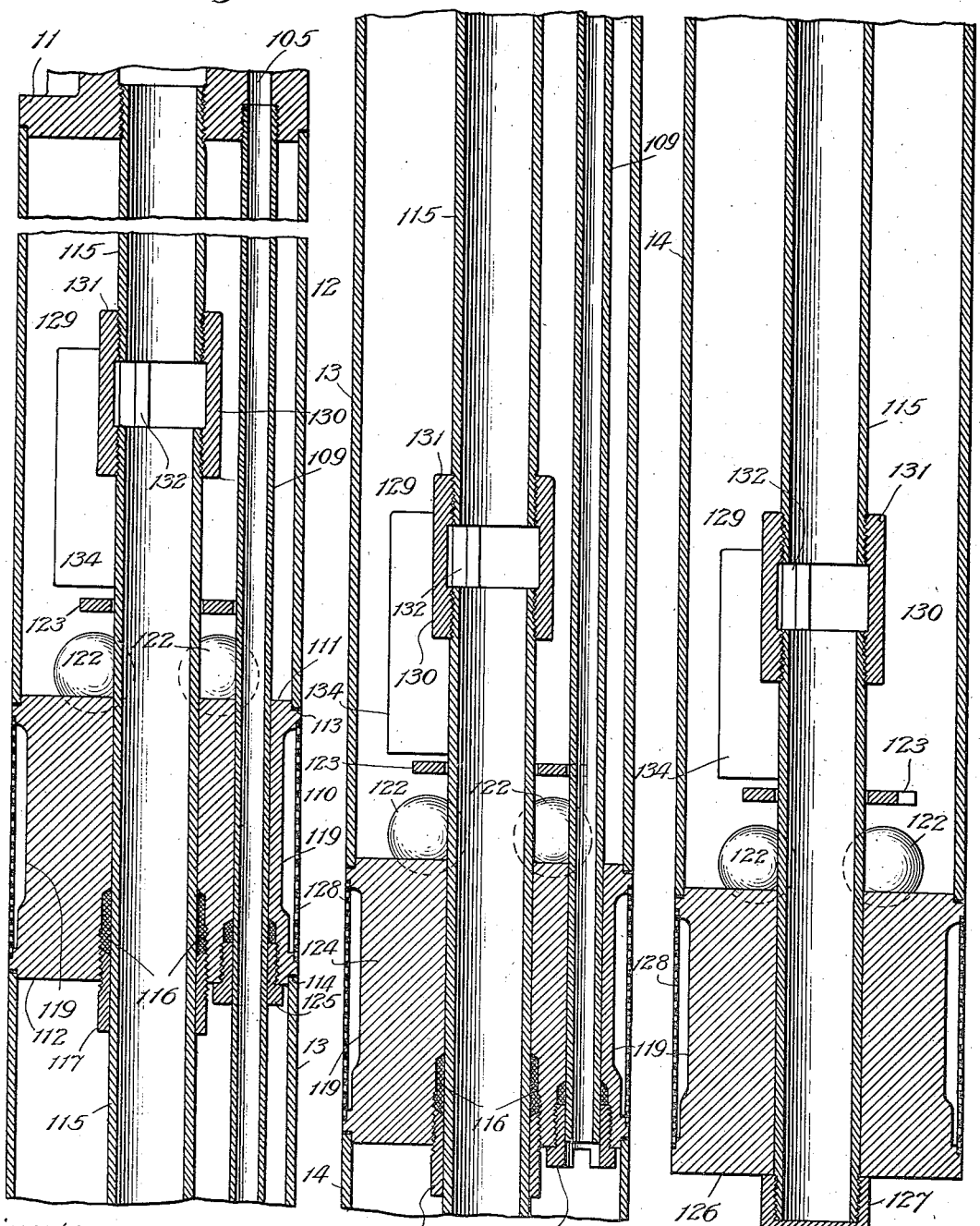

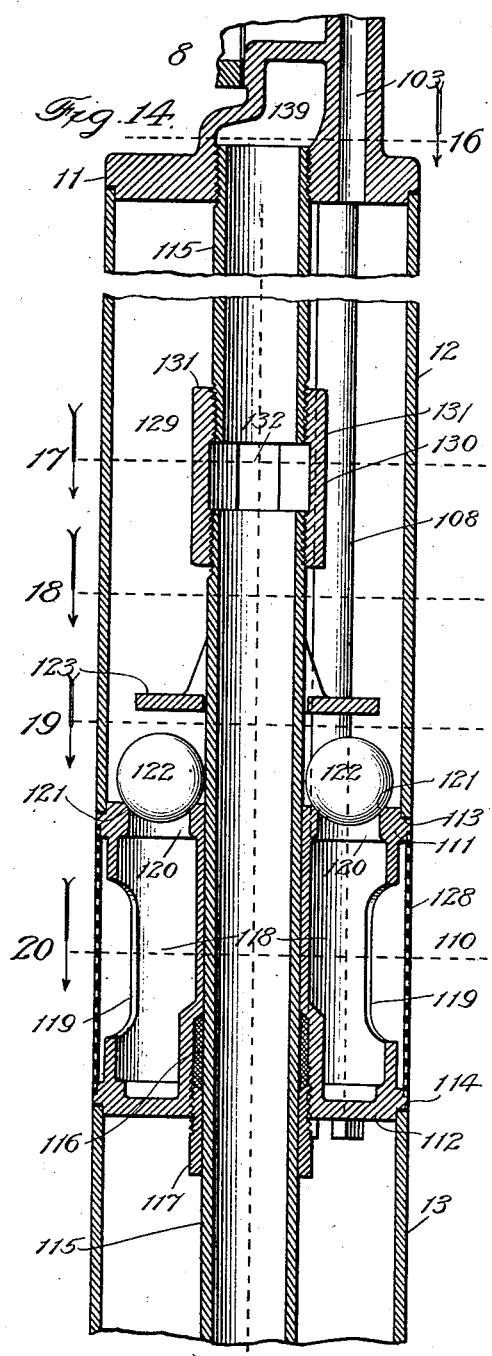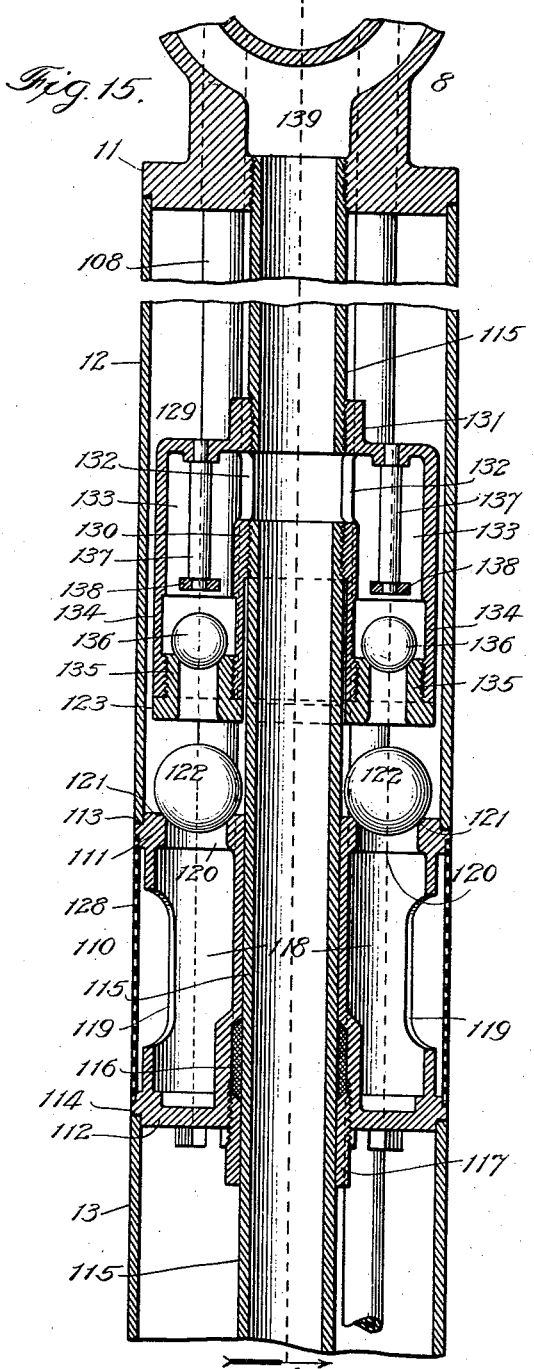

T. O. PERRY.
DEEP WELL PUMP.
APPLICATION FILED APR. 24, 1913.

1,085,756.

Patented Feb. 3, 1914.
10 SHEETS—SHEET 8.

Witnesses:
Inventor:
Thomas O. Perry,
By David H. Fletcher.
Atty.

T. O. PERRY.
DEEP WELL PUMP.
APPLICATION FILED APR. 24, 1913.

1,085,756.                                                    Patented Feb. 3, 1914.
10 SHEETS—SHEET 9.

Witnesses:                                                    Inventor:
                                                              Thomas O. Perry,
                                                              By David H. Fletcher
                                                              Atty.

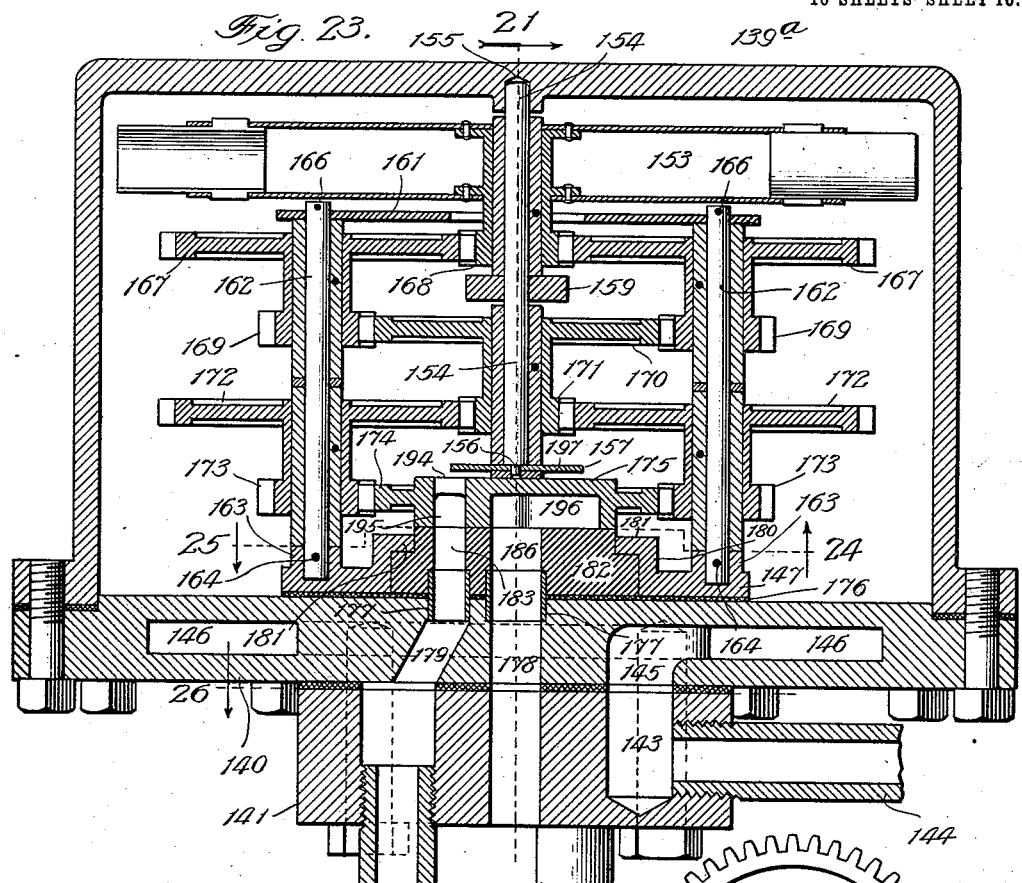

UNITED STATES PATENT OFFICE.

THOMAS O. PERRY, OF OAK PARK, ILLINOIS.

DEEP-WELL PUMP.

1,085,756.  Specification of Letters Patent.  Patented Feb. 3, 1914.

Application filed April 24, 1913. Serial No. 763,342.

*To all whom it may concern:*

Be it known that I, THOMAS O. PERRY, a citizen of the United States, residing at Oak Park, in the county of Cook and State of Illinois, have invented certain new and useful Improvements in Deep-Well Pumps, of which the following is a description, reference being had to the accompanying drawings, forming a part of this specification, in which corresponding numerals of reference in the different figures indicate like parts.

My invention relates to pneumatic pumps for raising water from wells, cisterns and other sources of supply to higher levels by means of compressed air, and it consists in certain improvements upon Letters-Patent No. 485,880, issued to me on November 8th, 1892.

In the type of pump referred to, the compressed air is delivered through a controlling valve located at or near the ground surface, to pipes leading to the water-chambers below, from whence exhaust pipes are led upwardly to the valve. This feature, when applied in deep wells, necessitates such an extended travel in order to exhaust the air, coupled with so much friction in the pipes as to materially reduce the efficiency of the pump and lessen its capacity. Furthermore, in the patented construction referred to, the manner of mounting, and adjusting and the means employed for maintaining it upon its center were such as to limit the capacity of the exhaust port, while the actuating means provided tended to so distort its movement as to cause undue wear and consequent leakage. Again, the motor-element by which it was driven was subject to similar defects.

The object of my invention is to overcome these objections and to provide means whereby the air controlling valve may be located in immediate proximity to the water chambers, so as to permit the exhaust to be made at or near that point.

A further object is to so construct the air-valve and combine it with actuating mechanism that it may at all times be balanced upon its axis so that all centering or pivoting devices may be eliminated and the space which would otherwise be required therefor, utilized to increase the capacity of the exhaust port.

To these and other ends my invention consists in the combination of elements hereinafter more particularly described and definitely pointed out in the claims.

Figure 17:
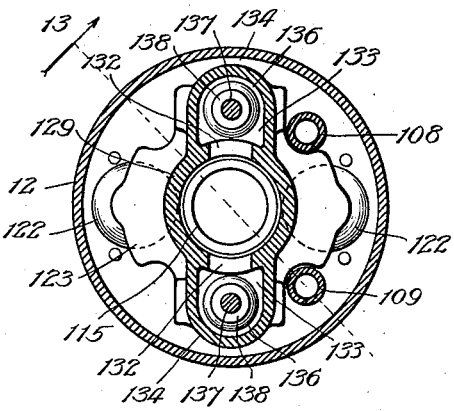
Figure 18:
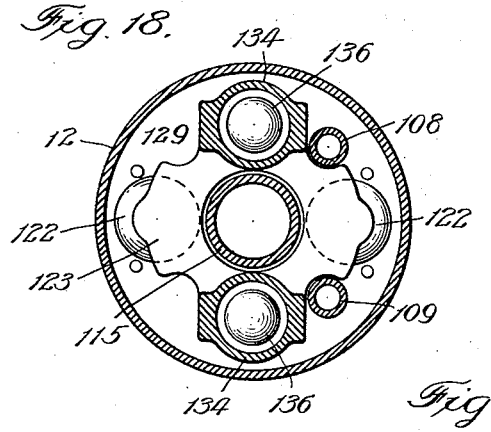
Figure 19:
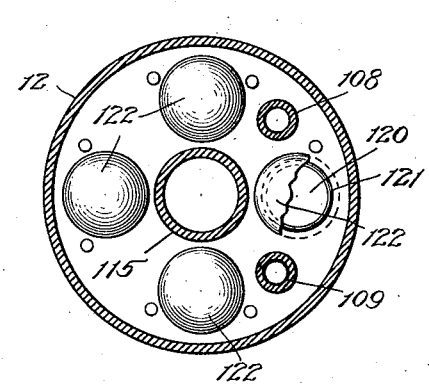
Figure 20:
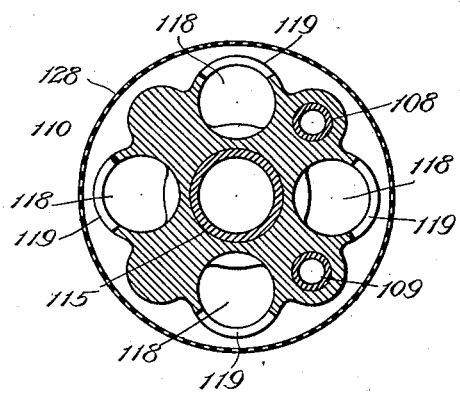
Figure 21:
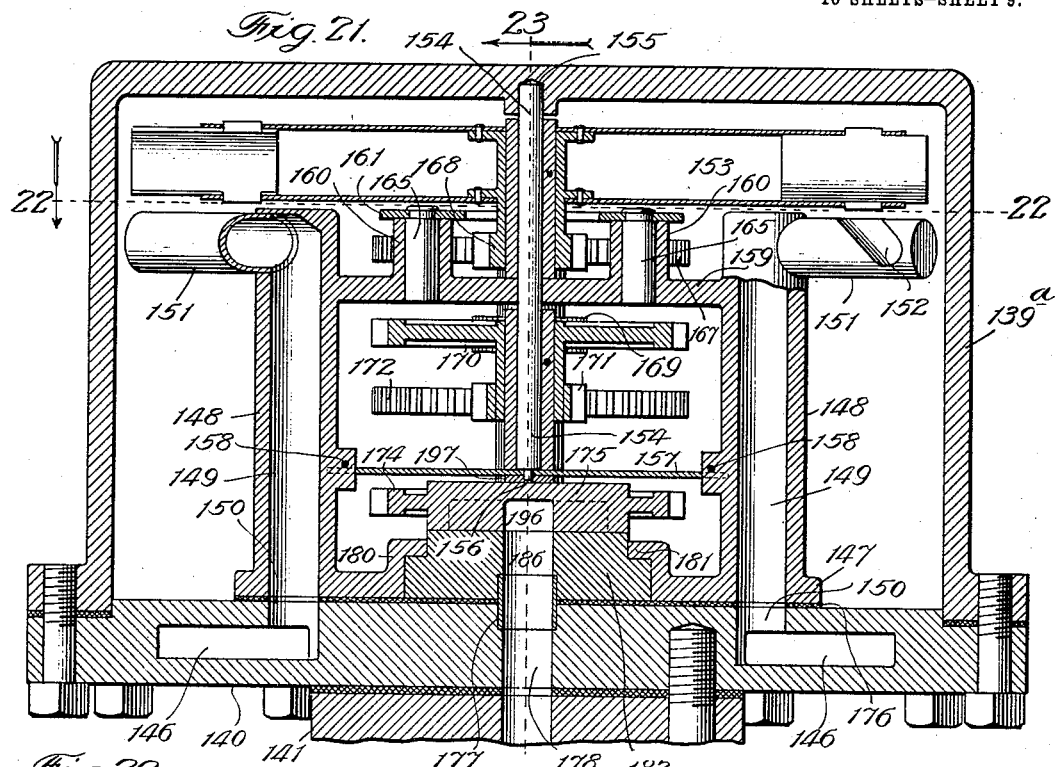
Figure 22:
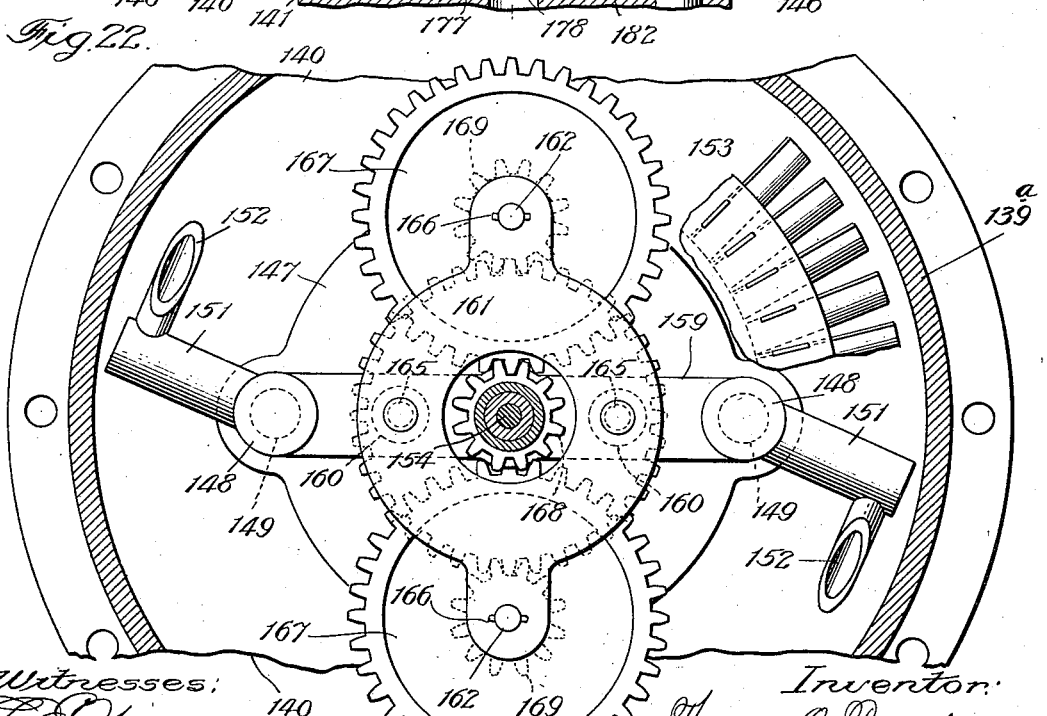

In the drawings, Figure 1, is a vertical sectional view of a well showing my improved pump in elevation therein, the parts being broken transversely, Fig. 2, is a general view in elevation showing a modified construction, Fig. 3, is a central vertical sectional view of the motor casing, and compressed air receiving chamber, taken upon the line 3, Fig. 5, viewed in the direction of the arrow there shown, Fig. 4, is a sectional view in plan taken upon the line 4, Fig. 3, Fig. 5, is a central vertical sectional view of the motor casing taken upon the line 5, Fig. 3, viewed in the direction of the arrow there shown, Fig. 6, is a central vertical sectional view of a portion of the air-pipe, showing a union pipe connection and a valve-rod located in said pipe, together with a bearing therefor and a toggle-joint connection, Fig. 7, is a sectional plan view taken upon the line 7, Fig. 6, Fig. 8, is a central vertical sectional view of the air-valve casing taken upon the line 8, Fig. 9, viewed in the direction of the arrow there shown, Fig. 9, is a sectional view in plan, taken upon the line 9—9, Fig. 8, Fig. 10, is a bottom sectional view taken upon the line 10, Fig. 8, Fig. 11, is an interior view of the valve casing, and interior mechanism, partly in section, taken upon the line 11, Fig. 8, viewed in the direction of the arrow there shown, said section line being taken in the plane of the joint between the two halves of the casing, Fig. 12, is a like view taken upon the line 12, Fig. 8, viewed in the direction of the arrow there shown, Fig. 13, is a vertical sectional view of the superimposed water chambers, taken upon the line 13, Fig. 16, viewed as indicated by the arrow, Fig. 14, is a vertical sectional view of the upper water chamber and a portion of the one below it, taken upon the line 14, Figs. 15, and 16, viewed in the direction of the arrows shown in said figures respectively, Fig. 15, is a like view taken upon the line 15, Figs. 14, and 16 respectively, viewed in the direction indicated by the arrows, Fig. 16, is a sectional plan view taken upon the line 16, Fig. 14, Fig. 17, is a like view taken upon the line 17, Fig. 14, Fig. 18, is a like view taken upon the line 18, Fig. 14, Fig. 19, is a like view taken upon the line 19, Fig. 14, Fig. 20, is a like view taken upon the line 20, Fig. 14, Fig. 21, is a vertical sectional view, taken upon the line 21, Fig. 23 viewed in the direction of the arrow there shown, said view representing a modification of the invention in which the air-valve is located within the motor casing, Fig. 22 is a sectional plan view thereof taken upon the line 22—22, Fig. 21, Fig. 23, is a sectional view taken upon the line 23, Fig. 21, viewed in the direction of the arrow there shown, Fig. 24, is a bottom view of the air-valve, taken upon the line 24, Fig. 23, Fig. 25, is a sectional view in plan taken upon the line 25, Fig. 23, showing the valve seat, and Fig. 26, is a plan view of a block or member beneath and secured to the base-plate of the combined motor and valve casing, taken upon the line 26, Fig. 23.

Referring to the drawings, 1, Fig. 1, represents a bored well having an enlarged chamber 2, at the top adapted to be protected by means of any suitable cover or housing 3. Located within said chamber is an air-tight metal casing, generally designated by 4, consisting of a hollow cylindrical casting 5, also shown in Figs. 3, and 5, removably attached to a base-plate 6. An air-pipe 7, which is tapped into said base-plate, is extended downwardly therefrom into communication with a valve-casing generally designated by 8, Figs. 1, 5, 8, 9, 11 and 12, into the top of which is tapped a water discharge-pipe 9, leading upwardly to a level at or near the surface and connecting with a branch pipe 10, Fig. 1, adapted to discharge into a cistern or reservoir.

The valve casing, generally designated by 8, is provided with an integral circular base-plate 11, Figs. 1, 8 and 12, which is attached by means of a water-tight joint to the top, so as to form the head for a hollow water cylinder comprising the uppermost of a series of not less than three cylinders, 12, 13 and 14 respectively, Figs. 1, 8, 10, 12 and 17 to 19 inclusive.

Having referred to the general features of the structure, I will now describe them in detail, commencing with the motor, shown in Figs. 3, 4 and 5. Communicating with an air compressor or other source of compressed air, not shown, is a pipe 13, Fig. 5, connected with a nipple 14, which in turn, is tapped into a bore 15, formed in the base-plate 6 of the motor casing. Said bore is in communication with a duct 16, which is extended laterally therefrom in opposite directions and thence upwardly to tubes 17, which are located within the casing diametrically opposite to each other and attached to the base-plate by means of lugs 18, secured thereto as shown in Fig. 4. Said tubes are closed at the upper ends and provided with discharge nozzles 19, which are arranged to point in opposite directions with respect to each other and are inclined upwardly at angles oblique to the plane of the horizon for the purpose hereinafter stated.

Connected by means of pins 20, Fig. 3, to lugs 21, formed upon the tubes 17, is a horizontal supporting bar 22, also shown in Fig. 5, to which is secured a vertical pivot post 23, located at the center of the casing. Journaled upon said post is a sleeve 24, to which is fitted a secondary sleeve 25, having annular flanges 26, to which disks 27, are riveted or otherwise rigidly secured. Said disks form the body of a turbine wheel and serve as supports for a series of equidistant concave wings or vanes 28, which are attached to the periphery thereof by means of tongues 29, fitted into slots or in any approved way. A sleeve 30, fitted upon the sleeve 24, forms a hub for a pinion 31, which is rigidly attached thereto.

Fitted to the inner face of the base-plate 6 and attached by means of screws 32, is a bracket generally designated by 33, to which is rigidly secured vertical studs 34, located diametrically opposite to each other in the plane of the axis of the pinion 31. Gears 35, having elongated hubs 36, are journaled upon said studs and are in mesh respectively with the pinion 31. Upon the hubs 36, are mounted pinions 37, Fig. 5, which are in mesh upon diametrically opposite sides thereof with a gear 38. Said latter gear is provided with a depending hub 39, the axis of which is in alinement with the stud 23 above. Fitted to said hub is a hardened bearing plate 40, a counterpart 41, of which is fitted within a cap portion 42, of the bracket member 33, the two serving as race-ways for ball-bearings, the balls 43, of which are held within a suitable cage or retaining member 44. A portion of the bracket 33 consists of a semi-circular wall which is concentric with a central bore 45, formed in the base-plate 6, so as to form a housing above and partially around said bore, into which latter the air-pipe 7 is tapped, thereby bringing the chamber of the motor casing into which compressed air is forced, into direct communication with the chamber within the air-valve casing 8.

A drive-rod 46, for actuating the air-valve through the medium of interposed gears, as hereinafter described, is tapped into the hub 39, as shown at 47, so that the entire weight of said rod is supported upon the ball-bearings described and said rod is extended downwardly within the air-pipe 7, to the valve casing. In wells of considerable depth it is obvious that the air-pipe, as well as the drive-rod, would be made in coupled sections and inasmuch as it would not be practical to make them perfectly straight, means should be provided for centering the rod within the pipe as well as for overcoming other irregularities which might cause wear and friction. In Fig. 6, I have shown a coupling 47ª, for connecting two sections of the air-pipe. A spider 48, provided with radial arms and having a central bore, is tapped into the coupling beneath the ends of the pipe sections and the drive rod is projected through the central bore. The portion 49, having said bore is preferably elongated and provided with a filling 50, of Babbitt metal or wood to form a bearing for said rod. The meeting ends of the rod are provided with sleeves 51, rigidly attached thereto, into the projecting ends of which is inserted a coupling member 52, the diameter of which is somewhat less than that of the bore of the sleeves to permit of slight lateral play. Pins 53, extending through said sleeves and member, serve to complete the coupling so as to form a knuckle joint.

Upon the upper end of the short section of the rod 46, which extends into the valve casing 8, as shown in Fig. 5, is attached a like sleeve 51, connected in like manner through a coupling 52 with a more elongated sleeve 54, having a longitudinal opening in the upper end into which is loosely fitted a squared or flattened portion 55 upon the lower end of the rod section connected therewith, thereby enabling the rod to rotate said sleeve while permitting a longitudinal movement therein. A circular nut or disk 56, is attached to the lower end of said squared portion and formed to loosely fit the bore in said sleeve. This construction provides for any elongation or longitudinal movement in the rod while preventing the same from interfering with the valve mechanism or placing stress upon the pump cylinder.

The valve casing 8, is formed in two parts or halves separable from each other upon the line 12, Fig. 8, one being adapted to contain the valve and its actuating mechanism and the other the valve-seat, its connecting ports and ducts and channels communicating with the water-discharge pipe. The former is provided with a flattened portion 57, Fig. 11, adapted to fit upon a like flattened portion or face, 58, Fig. 12, the former being provided with screw holes 59, adapted to register with like screwholes 60, in the latter for the reception of screws, 61, Fig. 1. A packing 62, Figs. 8 and 9, of rubber or other suitable material is placed between the meeting faces to form a tight joint. When thus connected a closed valve-chamber 63, is formed between the two parts of the shell or casing. That portion of the valve rod 46, within the casing, is journaled in bearings 64, Figs. 8 and 9, fitted in brackets 65, attached to lugs 65ª cast in the valve casing. A like bearing 66, fitted within a central bore in a screw plug 67, serves to receive the lower end of the shaft, which rests upon a thrust block 68, in said bore. Rigidly mounted upon said valve-rod are beveled pinions 69, 70, which are adapted respectively to engage beveled gears 71, 72, mounted upon elongated hubs or sleeves 73, 74, each having a sleeve-like lining or packing 75, of anti-friction material. Said hubs 73 and 74, are journaled upon horizontal spindles 76, 77, one end of each of which is secured within a bore in the casing as shown, and the other in shallow bores in the brackets 65. Pinions 78, 79, are formed upon the hubs 73, 74 and adapted to engage with the teeth of an annular gear 80, shown also in Figs. 9, and 11, attached by means of rivets 81, to the face of an annular flange 82, formed upon the periphery of a circular valve 83. The periphery of said flange is upon the pitch line of the gear 80, and is in rolling contact with rings 84, and 85, upon the hubs 73 and 74. The periphery of said rings is upon the pitch-line of the pinions 78, 79 adjacent thereto.

The valve 83, is not centered nor intended to be centered upon an ordinary bearing but is held against eccentric movement when rotated, by means of the gear 80, having the teeth upon diametrically opposite sides thereof in engagement with those of the pinions 78 and 79. Inasmuch as the axis of the valve is horizontal, the circular flange 82, and rings 84, 85, perform important functions in retaining the gear 80, from vertical displacement. This feature, however, may be dispensed with in case the axis of the valve is made vertical as hereinafter described. A central boss 86, Figs. 8 and 9 is formed upon the outer face of the valve which is in contact with a flat spring 87, the ends of which rest against shoulders 88. The sole purpose of the spring is to hold the valve against its seat when there is no compressed air in the valve-chamber. When air under compression is present, the valve will be pressed uniformly against its seat and being retained by the gears upon a fixed center, the rotation of the gears will cause it to "float," or to maintain its axis upon that center. Said valve is provided with an inlet-port 89, and an exhaust port or chamber 90, the inlet-port leading into an elongated inlet chamber 91, formed in said valve and extending a substantially equal distance upon opposite sides of said port for the purpose hereinafter stated. Said exhaust chamber is longer than the inlet chamber and is shaped substantially as shown in Figs. 8 and 11 so as to include a space around the axis of the valve for the purpose hereinafter stated. The valve is preferably formed from phosphor-bronze or other metal or alloy, while I prefer to make the valve-seat from some rubber-like or gutta-percha-like composition such, for example, as hard rubber, for which water is adapted to form a satisfactory lubricant.

A circular depression is formed in that half of the valve casing opposite to that in which the valve mechanism described is located, into which depression is accurately fitted a flat ring 92, adapted to be secured in place by means of screws 93, Fig. 12. An annular flange 94, is formed upon said ring which is extended into the casing recess, the inner diameter of said flanged portion being greater than the inner diameter of the ring so that an undercut portion will be formed in the space inclosed. A valve-seat 95, formed from hard-rubber or analogous composition is molded within the circular chamber described, so that a portion thereof will lie beneath the overhang formed by the inner portion of the ring. The face of said valve-seat which is flattened and properly surfaced, is, by preference, extended slightly beyond that of the face of said ring. Any tendency of the valve-seat to warp is prevented by the ring 92 which holds it firmly in place. Said valve-seat is provided with air inlet-ports 96, 97 and 98, which alternately act as exhaust ports, and a central exhaust port 99, which latter is in communication with an exhaust duct 100, which is extended horizontally within said casing and thence upwardly, as shown in Fig. 8 to a short exhaust pipe 101, Fig. 1, which is tapped into an offset 102, in said casing.

Inasmuch as the composition valve-seat is set within a metal casing it is important that means should be provided to prevent air leakage in view of the variation in expansion and contraction of the different materials used. This I prefer to accomplish in the following manner: The ports 96, 97, and 98, are arranged to register respectively with air-ducts 103, 104, and 105, which are extended horizontally and thence downwardly in the valve casing, one or more being shown in full and others indicated in dotted lines in Figs. 8, 9, 10, 12, and 14 and 16. In the horizontal portion of each of said ducts as well as in the exhaust duct 100, I provide metal thimbles or sleeves 106, Figs. 8 and 9, which are projected through openings formed in a rubber packing 107, placed against the rear wall of the chamber in which the valve-seat is molded. One end of each of said thimbles is soldered within a corresponding duct while the other projects forwardly beyond said packing. These are first placed in position and the valve-seat molded around them. When subjected to a temperature below normal, as would be the case in a well, the composition is caused to shrink around said thimbles and form joints so tight as to prevent air leakage under the highest pressures.

The air duct 103 is in direct communication with the top of the water chamber of the cylinder 12 or upper cylinder, as shown in Figs. 8 and 14. The duct 104, communicates directly with an air tube 108, Figs. 8, 10, 14, 15 and 17 to 20 inclusive, which is extended downwardly through the chamber 12 and the water intake therefor hereinafter described, to the upper end of the chamber within the cylinder 13, while the duct 105 is in communication with a like air tube 109, Figs. 10, 13, and 17 to 20 inclusive which is projected in like manner through the cylinders 12 and 13 and the water intakes therefor to the top of the chamber within the cylinder 14. I will first describe said water intakes, after which I will explain the manner of securing said tubes therein. A hollow metal casting generally designated by 110, Figs. 13, 14, 15 and 20, is formed within circular top and base portions 111 and 112, the former having an offset or shoulder 113 into which is fitted the lower end of the cylinder 12, and the latter a like offset 114, for the reception of the upper end of the cylinder 13. A central bore is formed in said casting for the reception of a water discharge pipe 115, which is formed in sections but in effect forms one continuous discharge pipe which is extended centrally through the three superposed water chambers. An annular packing chamber 116 is formed around said pipe, the packing in which is compressed in a well known way around the water pipe by means of a packing-nut 117, tapped therein. Located at equal distances from the center of said intake member and from each other, are four water intake passages or chambers 118, which are provided with elongated openings 119 at the sides to permit an inflow of water thereto. The bottom portion 112, serves as a cap for the chamber below it and the part 111, as a base for the chamber 12 above. Valve inlet openings 120, are formed in the part 111, having valve-seats 121, for the reception of ball valves 122. A stop-plate 123 is secured above said balls to limit the upward movement thereof, which plate performs another function presently to be referred to. The tube 108, as stated is projected through a bore in the water intake member 110, and is packed at the lower end in the same well known manner shown in connection with the tube 109, hereinafter to be referred to. The water intake member 124, Fig. 13, which is interposed between the cylinders 13 and 14, corresponds in all respects in construction and operation to the member 110, and hence the parts shown in connection therewith corresponding in function, have been given like reference numerals. The tube 109 is provided with an annular packing gland 125, which is tapped into an enlarged bore in the said water intake member in a well known way. The water intake member 126 which forms the base of the lower cylinder is a modification of the others and differs therefrom in no material respect. The discharge-pipe 115, is passed through it and is provided upon the lower end with a screw-cap 127, which bears against the bottom of the member 126. The discharge-pipe 115 serves as a tie-rod to connect the series of cylinders and intake members and when the screw-cap is tightened they are rigidly held in place. Around each of the three water intake members is secured a perforated shield or sieve 128.

Secured to or formed upon the plate 123 above the water intake in each of the water-chambers, is a metal housing generally designated by 129, Figs. 13, 14, 15, 17 and 18, which consists of a central cylindrical body portion 130, having an upwardly extended neck portion 131, into which the water discharge pipe 115 leading upwardly therefrom is tapped. Lateral openings 132, are in communication with chambers 133, the walls of the lower portions of which as shown at 134, Figs. 15 and 18, are cylindrical and extended below said body portion. A nipple 135, Fig. 15, is tapped into the lower end of said cylindrical parts, said nipple having a central opening with a valve seat at its upper end adapted to seat a ball check-valve 136. Depending studs 137, are secured within said housings as shown in Figs. 15 and 17 and are provided with disks 138, upon their lower ends which serve as stops to limit the upward movement of said balls. The section of water pipe 115, below said housing is extended upwardly between said cylindrical portions and tapped into the lower part of the main body immediately below the opening 132, so that said body portion forms a union between the upper and lower water-pipe sections in each water chamber.

The uppermost section of the water discharge pipe 115, within the chamber 12, is tapped into the base 11, of the valve casing and communicates directly with a channel 139, Figs. 14 and 15, which divides as shown in said last named figure and indicated in dotted lines in Fig. 12, so as to pass upwardly upon opposite sides of the valve mechanism when they are again united and caused to lead directly into the water discharge pipe 9.

In the foregoing specification I have described what I regard as the preferred form of the device as applicable more particularly to deep wells. Its operation is as follows: Air from a compressor or other source of compressed air supply, is introduced through the pipe 13, see Figs. 1, 3, 4 and 5, ducts 16, tubes 17 and nozzles 19, to the air-chamber within the casing 4. The jets of air from said nozzles are caused to impinge upon the wings 28, of the turbine motor wheel upon diametrically opposite sides thereof and in opposite directions, thereby balancing the wheel and preventing frictional stress thereon. Moreover, said jets being directed upwardly at an angle to the plane of the horizon, serve to impart a lifting action to the wheel to the extent of balancing its weight and relieving the downward end thrust upon its bearing. Said motor wheel being driven at a relatively high rate of speed, it is necessary to gear down from it in order to actuate the valve at the desired rate of speed and this in a manner to place but nominal stress upon the necessarily long actuating rod by which the motor mechanism above is connected with the driven mechanism in the well. By connecting the pinion 31 with the diametrically opposite gears 35 and connecting those in turn through the pinions 37, with the central gear 38, with the hub of which the motor rod 46 is connected, it will be noted that each of the central elements is balanced in the sense of receiving an equal driving pressure at diametrically opposite points so as to eliminate decentralizing stress. The weight of the driving rod being suspended upon ball bearings as described and expansion and contraction being provided for, that portion of the driving rod within the valve casing is free from any distorting tendency and inasmuch as it is only required to drive the few gears in the valve casing connected with the rotary air-valve, the stress upon it is small and rotary only.

The compressed air which is admitted to the casing 4 after exerting its force directly upon the turbine, passes downwardly through the air-pipe 7, into the valve casing. As the valve is rotated by the action of the gears, the inlet port 89, is brought successively over the inlet ports 96, 97 and 98. Assuming it to be in registration with the former, air under pressure is forced through the duct 103, directly into the uppermost water chamber, which, being immersed in the water of the well, may be assumed to have filled with water through the intake 110 and valve openings 120. As soon, however, as air is admitted to said chamber the inlet valves 122 are seated and the air pressure upon the water causes the valves 136, Fig. 15, to be lifted when the water is caused to flow upwardly into the chambers 133, and through the openings 132 into the water discharge pipe 115. It will be noted that while the inlet port 89 is in the position assumed, the exhaust port 90 will have been brought opposite the ports 97 and 98, thereby permitting the air to be exhausted from the other water-chambers, through the pipes 108, and 109, ducts 104 and 105, exhaust chamber 90, and discharge duct 100 into the escape pipe 101. As the rotation of the valve is continued air will be forced into the successive water chambers thereby forcing the water therefrom into the discharge pipe while the other chambers will be discharging air and filling with water, the described operation occurring successively in each.

In view of the fact that any practical air pressure may be employed, it is obvious that the water may be forced out of the chambers with great rapidity; but inasmuch as the water inflow is dependent upon gravity, it cannot be so controlled; it follows, therefore, that the valve capacity for exhausting air should be greater than that for injecting it. For this reason, the exhaust chamber 90, is made longer than the inlet chamber 91, and the exhaust duct 100, is proportionately large. In the example illustrated, I have shown three inlet ports but there may be as many as there are water chambers, which latter may be increased indefinitely if desired, in order to insure the required capacity in wells of exceptionally small diameter. As stated, the ports are equi-distant and when three are employed, I have found that in order to secure the best results, the valve chamber 91 should be of such a length that it may partially cover two ports at once, preferably reaching from center to center of each. This feature insures a free passage for air at all times into one or two of the three water chambers, and in no position of the air valve can the air supply be cut off from all of the water chambers. I prefer, however, to make the exhaust chamber of a length sufficient to more than fully cover two ports at the same time, so that the filling period may considerably exceed the discharging period. By dispensing with a central bearing or pivot for the rotatable valve, I am enabled to utilize the area at and immediately around the center for purposes of exhaust which greatly increases that desirable feature, and in like proportion increases the capacity of the pump.

As a result of balancing the valve in the manner described, as well as the motor and gearing by which the valve is driven, the life of the parts is greatly prolonged. Again, by placing the valve in the well and employing two divided sets of gears, I am enabled to dispense with a long air-exhaust pipe which would necessarily have to lead back to the valve above; thereby increasing the air friction and greatly lessening the capacity of the pump. This construction also leaves the motor and the greater portion of the gears where they are readily accessible and the placing of the valve actuating rod within the air-pipe serves to protect it from injury and possible displacement. Other things being equal the capacity of the pump is materially enhanced by increasing the number of chambers, three chambers giving an added capacity over two of about fifty per cent.

In Figs. 21 to 26, I have shown a modified construction in which the valve is inclosed in the motor case. In this construction the main inclosing case 139ª, is similar to that heretofore described being bolted to a circular base 140, Figs. 21, 22, and 23, to the bottom of which is secured in like manner, a circular metal block 141, provided with a vertical duct 143, Figs. 23, and 26, with which the compressed air supply-pipe 144 is caused to communicate. Said duct is fitted to register with a similar short duct 145, in said base. A frame-like casting having an annular base 147, is rigidly secured to the base 140, said casting being provided with upright posts or standards 148, Figs. 21 and 22, each having a duct 149 therein, which communicates at the bottom through a port 150, in said base with the duct 146, and at or near the upper ends with a tube 151, having a laterally and upwardly inclined discharge nozzle 152, said nozzles being projected in opposite directions with respect to each other. A turbine wheel generally designated by 153, conforming in all respects to that hereinbefore described, is mounted upon a spindle 154, the upper end of which projects into a bore 155 in the casing, while a pintle 156, in the lower end is projected through a bore in a flat spring 157, the ends of which bear upwardly against pins 158, Fig. 21, secured in bosses upon said standards. The further purpose of said spring will be stated at the proper time.

A horizontal connecting member or bridge 159, is formed in the casting between the standards 148, which is provided with bosses, 160, adapted to serve as supports for an elongated tie-plate, 161, the long way of which is extended at right angles to the bridge 159 and is provided with bores near the ends to receive the upper ends of vertical spindles 162, which are in a common plane with the axis of the spindle 154. The lower ends of the spindles 162 rest in bores formed in bosses 163, upon the annular base member 147, and are held rigidly in place by means of pins 164. The plate 161 is provided with downwardly projected studs 165 which are rigidly attached thereto and fitted loosely but accurately into vertical bores in the bosses 160. This construction serves to prevent the ends of the plate 161 from being moved laterally.

Pins 166, serve to hold the plate in connection with the spindles. Mounted upon the spindles 162, are gears 167, both of which are in engagement with a pinion 168, upon the hub of the turbine wheel. Pinions 169, upon the hubs of the gears 167, are adapted to engage with a gear 170, upon the lower portion of the spindle 154. A pinion 171, upon the hub of the gear 170, is in mesh with gears 172 upon the lower portions of the spindles 162, upon the hubs of which are mounted pinions 173, which in turn are arranged to engage a gear 174, which is concentric with and formed upon the periphery of a circular, rotary valve 175, a bottom view of which is also shown in Fig. 24. A rubber packing 176, is interposed between the base-plate 140, and the annular casting 147, which packing is provided with openings for the reception of metal thimbles 177, one half of one of which extends downwardly into a central exhaust duct 178, and corresponding portions of the others into air inlet ducts located at equal distances from the center of said exhaust duct and from each other, one of which ducts, 179, is shown in Fig. 23. Said portions of said thimbles are tightly fitted or soldered into said ducts to make air tight joints, while the remaining portions are extended above the level of said packing. The inner portion of the annular base member 147 is extended upwardly as shown at 180, to form a cylindrical wall upon the top of which is formed an inturned circular flange 181. See also Fig. 25. Within the space formed by said wall and preferably extending slightly above the level of said flange is molded a valve seat 182, formed from a material having rubber-like characteristics such as has been hereinbefore described. Said valve-seat is provided with inlet ports 183, 184 and 185, at equal distances from each other and from the center of said seat and a central exhaust-port 186. The port 183, communicates with the duct 179, shown in full lines in Fig. 23 and indicated in dotted lines in Fig. 25, and the ports 184 and 185, with like ducts 187 and 188, indicated by dotted lines in said last named figure. The duct 179, is in communication with an air-pipe 189, the duct 187 with a like pipe 190 and the duct 188 with a like pipe 191, Figs. 2, 23 and 26, the upper ends of which pipes are screwed into the bores forming extensions of said ducts and their lower ends into the top of a casing 192, adapted to be submerged in a well, or other source of water supply, said casing being divided into separate compartments with which said pipes communicate respectively. Said casing is provided with a water discharge pipe 193, leading to the surface, and may conform substantially to that described in my Letters-Patent hereinbefore referred to. The valve 175 is preferably formed from metal or metallic alloy and is provided with an inlet port 194, an elongated inlet chamber 195, and an exhaust chamber 196, all conforming substantially to those hereinbefore described. The spring 157, bearing upon a central boss 197, upon the valve serves to hold the latter in place when no compressed air is present.

In the preferred construction set forth, there is but one air pipe extending from the motor to the well, the exhaust being at the water surface. In the modified construction, there are as many pipes leading to the ground surface as there are water chambers and each pipe in succession serves alternately as an intake and exhaust pipe. The advantage of this construction is that the motor and controlling valve may be located in any desired place remote from the well.

It will be noted that all of the gearing in both constructions is upon a balanced principle; or, in other words, the propelling force is applied as far as possible upon diametrically opposite sides upon both driving and driven gears and finally to the valve which is held in its axial position by means of the gears by which it is driven. In case the valve axis is vertical, no special means is required to maintain the gear teeth upon the pitch line.

The mode of operation of the modified structure is too obvious to require explanation in view of that given of the preferred form.

While I have shown a turbine for actuating the gears and other valve controlling mechanism, I do not wish to be limited thereto, inasmuch as it is obvious that the more important advantages described may be utilized with varying forms of motors without departing from the spirit of the invention. I prefer, however, to use a turbine for the reason that it adapts its speed to varying degrees of air pressure and for this reason is more efficient than others.

As heretofore set forth, I have, in the preferred form, utilized two sets of reduction gears, one in the gear casing at the ground surface, and the other in the air valve casing in the well. This is an important feature, in that it enables me to employ a light rod for connecting the two rather than a heavy one which would necessitate a much larger air-pipe and heavier connecting rod. In the gears within the valve casing I prefer to make a reduction of about sixteen to one, which enables the valve to be driven at the desired speed while rotating the driving rod at the rate of about one hundred revolutions per minute.

In Figs. 5 and 8, I have shown a small opening 139$^b$, in the web or wall 139$^c$, which separates the air valve chamber from the water discharge pipe. The diameter of this opening would ordinarily be about one sixteenth of an inch, more or less, and its purpose is to permit a sufficient quantity of air to enter the water pipe to lighten the column, thereby lessening the air pressure required in the pump chambers.

Having thus described my invention, I claim:

1. In a pneumatic pump, the combination with a source of compressed air and a plurality of water chambers, each having intake and outlet water valves, of an air-valve adapted to admit and release compressed air to and from said water chambers in succession, a valve-chamber inclosing said air-valve in proximity to said water-chambers, a valve actuating motor remotely placed with reference to said air-valve, an air-pipe for conducting compressed air to said valve chamber and a valve actuating shaft between said valve and said motor.

2. In a pneumatic pump, the combination with a source of compressed air and a plurality of water-chambers each having intake and outlet water valves, of an air-valve adapted to admit and release compressed air to and from said water-chambers in succession, a valve-chamber inclosing said air-valve in proximity to said water-chambers, a valve actuating motor remotely placed with reference to said air-valve, a pipe for conducting compressed air to said valve chamber, and a valve actuating shaft paralleling said air-pipe between said valve and said motor.

3. In a pneumatic pump, the combination of a plurality of water chambers, each having an inlet and an outlet water-valve, an air-valve casing located within the well in immediate proximity to said water-chambers, a rotary air-valve inclosed within said casing for alternately admitting air to and releasing it from said chambers in succession, a pipe for conveying compressed air from a remote point to said casing, gears within said casing for rotating said valve, a motor located remotely from said casing and means for operatively connecting said motor with said gears.

4. In a pneumatic pump, the combination of a plurality of water chambers, each having an inlet and an outlet water-valve, an air-valve casing located within the well in proximity to said water chambers, a rotary air-valve inclosed within said casing for alternately admitting air to and releasing it from said chambers successively, a pipe for conveying compressed air from a remote point to said casing, gears within said casing for rotating said valve, a motor located remotely from said casing, and a rod inclosed within said air-pipe for connecting said motor with said valve rotating gears.

5. In a pneumatic pump, the combination of a plurality of water chambers, each having an inlet and an outlet water-valve, an air-valve casing located within the well in proximity to said water-chambers, a rotary air-valve inclosed within said casing for alternately admitting air to and releasing it from said chambers successively, a pipe for conveying compressed air from a remote point to said casing, a motor located remotely from said casing, gears connected therewith for gearing down the speed of said motor, gears in said valve casing for actuating said air-valve and an actuating rod for connecting said two sets of gears.

6. In a pneumatic pump, the combination of a plurality of water-chambers, each having an inlet and an outlet water-valve, an air-valve casing located within the well in proximity to said water-chambers, a rotary air-valve inclosed within said casing for alternately admitting air to and releasing it from said chambers successively, a pipe for conveying compressed air from a remote point to said casing, valve actuating gears within said casing, a motor located remotely from said casing, a rod inclosed within said air-pipe for connecting said motor with said valve rotating gears and bearings located within said pipe for maintaining said rod in a substantially central relation thereto.

7. In a pneumatic pump, the combination of a plurality of water-chambers, each having an outlet and an inlet water-valve, an air-valve casing located within the well in proximity to said water chambers, a rotary air-valve inclosed within said casing for alternately admitting air to and releasing it from said chambers in predetermined order, a pipe for conveying compressed air from a remote point to said casing, valve actuating gears within said casing, a motor located at a predetermined point above said casing, a vertical rod having its upper end in operative connection with said motor and its lower end with said valve-gears and ball-bearings at the upper end of said rod for supporting the weight thereof while allowing it to rotate.

8. In a pneumatic pump, the combination of a plurality of water chambers, each provided with an inlet and an outlet water valve, means for conveying compressed air to said chambers from a source of supply, a rotary valve for alternately admitting air to and exhausting it from said chambers in successive order, and means for simultaneously applying force in opposite directions upon diametrically opposite sides of said valve, to cause its rotation, whereby the axis of said valve may be maintained in alinement with that of its seat by said force applying means.

9. In a pneumatic pump, the combination of a plurality of water chambers, inlet and outlet water valves, means for conveying compressed air to said chambers from a source of supply, a rotary valve for alternately admitting air to and exhausting it from said chambers in successive order, means for simultaneously applying force in opposite directions upon diametrically opposite sides of said valve to cause rotation thereof, said rotating means serving to maintain the axis of said valve in alinement with that of the valve-seat and a motor in operative connection with said force applying means.

10. In a pump of the class described, the combination of a plurality of water chambers, each having a water inlet and a water outlet valve, a valve chamber, a rotary valve therein for controlling the admission of air to and its release from said water chambers in regular sequence, said valve being held against its seat by the air pressure within the valve-chamber and means for simultaneously applying force upon diametrically opposite sides of said valve to cause its rotation while holding it upon its axial center.

11. In a pneumatic pump, the combination with a rotary air-valve for controlling the admission and release of air to and from the pump-chambers, of a gear concentrically connected with said air-valve, driving gears in mesh therewith upon diametrically opposite sides thereof to balance said valve and hold it upon a given center while causing its rotation and means for actuating said driving gears in unison.

12. In a pneumatic pump, the combination with a rotary air-valve for controlling the admission and release of air to and from the pump chambers, of a gear concentrically connected with said air-valve, driving gears in mesh therewith upon diametrically opposite sides thereof to balance said valve and hold it as a result of opposing forces, upon a given center, said driving gears forming a part of dual trains in like balanced relation to each other and means for actuating the same.

13. In a pneumatic pump, the combination with a rotary air-valve for controlling the admission and release of air to and from the water chambers, a valve driving gear concentrically connected with said valve, a turbine motor wheel having an axial driving gear and two trains of gears connected with said axial gear and with said valve driving gear, said trains being located upon diametrically opposite sides of said axial driving gear.

14. In a pneumatic pump, the combination with a rotary air-valve for controlling the admission and release of air to and from different water chambers, said valve having an air inlet port and an exhaust chamber positioned with respect to each other to alternately cover ducts leading to said water-chambers successively as the valve is rotated, a gear concentrically mounted upon said valve, driving gears in mesh therewith, said gears being located upon diametrically opposite sides thereof, to actuate said valve while maintaining it upon a given axis, and a central exhaust duct in constant communication with said valve exhaust chamber.

15. In a pneumatic pump, the combination of a plurality of water-chambers, each having an outlet and an inlet water-valve, an air-valve casing located within the well in proximity to said water-chambers, a rotary valve inclosed within said casing for alternately admitting air to and releasing it from said chambers in predetermined order, a pipe for conveying compressed air from a remote point to said casing, valve actuating gears within said casing, a motor located at a predetermined point above said casing, a vertical rod having its upper end in operative connection with said motor while its lower end is connected with said valve-gears and means for supporting the weight of said rod from its upper end while permitting it to rotate.

16. In a pneumatic pump, the combination of a plurality of water-chambers, each having an inlet and an outlet water-valve, a motor, an air-valve casing located within the well in proximity to said water-chambers, a rotary air-valve inclosed within said casing for alternately admitting air to and releasing it from said chambers successively, a pipe for conveying compressed air from a remote point to said casing, reduction gears within said valve-casing for actuating said valve while reducing its speed with respect to that of the motor and an actuating rod interposed between said motor and said reduction gears.

17. In a pneumatic pump, the combination of a plurality of water-chambers, each having an inlet and an outlet water-valve, an air-valve casing located within the well in proximity to said water-chambers, a rotary air-valve inclosed within said casing for alternately admitting air to and releasing it from said chambers successively, a pipe for conveying compressed air from a remote point to said casing, a motor, a set of reduction gears connected therewith, a secondary set of reduction gears within said valve-casing for actuating said air-valve, and an actuating rod interposed between said two sets of reduction gears.

18. In a pneumatic pump the combination with a rotary air-valve for controlling the admission and release of air to and from the water chambers, a valve driving-gear concentrically connected with said valve, a motor having an axial driving gear and two trains of gears interposed between said axial gear and said valve driving gear, said trains being located upon diametrically opposite sides of said gears with which they are connected.

In testimony whereof, I have signed this specification in the presence of two subscribing witnesses, this 31st day of March 1913.

THOMAS O. PERRY.

Witnesses:
DAVID H. FLETCHER,
JENNIE L. FISKE.